US008275759B2

(12) United States Patent
Imig et al.

(10) Patent No.: US 8,275,759 B2
(45) Date of Patent: Sep. 25, 2012

(54) CONTEXTUAL QUERY SUGGESTION IN RESULT PAGES

(75) Inventors: Scott K. Imig, Redmond, WA (US); Kenneth Ward Church, Seattle, WA (US); Jean-Marie Larchevêque, Bellevue, WA (US); Samuel D. Paye, Jr., Seattle, WA (US); Silviu-Petru Cucerzan, Redmond, WA (US); Emily Blythe Pitler, Philadelphia, PA (US); Robert Rounthwaite, Fall City, WA (US); Ryen W. White, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 12/391,274

(22) Filed: Feb. 24, 2009

(65) Prior Publication Data

US 2010/0228710 A1    Sep. 9, 2010

(51) Int. Cl.
*G06F 7/00* (2006.01)
*G06F 17/30* (2006.01)
(52) U.S. Cl. .................... 707/706; 707/767; 707/770
(58) Field of Classification Search ........... 707/600–831
See application file for complete search history.

(56) References Cited

U.S. PATENT DOCUMENTS

| 6,772,150 | B1 | 8/2004 | Whitman et al. |
| 7,181,447 | B2 | 2/2007 | Curtis et al. |
| 7,747,611 | B1 * | 6/2010 | Milic-Frayling et al. ..... 707/722 |
| 8,019,748 | B1 * | 9/2011 | Wu et al. ........................ 707/713 |
| 2005/0197927 | A1 * | 9/2005 | Martineau et al. .............. 705/27 |
| 2007/0067305 | A1 * | 3/2007 | Ives ................................. 707/10 |
| 2007/0078828 | A1 | 4/2007 | Parikh et al. |
| 2007/0083232 | A1 * | 4/2007 | Lee ............................... 606/213 |
| 2007/0192318 | A1 * | 8/2007 | Ramer et al. ..................... 707/7 |
| 2008/0177717 | A1 | 7/2008 | Kumar et al. |
| 2008/0256061 | A1 | 10/2008 | Chang et al. |
| 2009/0187515 | A1 * | 7/2009 | Andrew et al. ................. 706/12 |

OTHER PUBLICATIONS

Acharya et al., Join Synopses for Approximate Query Answering, Nov. 5, 1998, Google, 1-27.*
Dilip Kumar Limbu et al., Contextual relevance feedback in web information retrieval, 2006, ACM, 138-143.*
"Enhancing Search Results", Retrieved at<<http://livedocs.adobe.com/coldfusion/8/indexSearch_09.html>>, Nov. 21, 2008, pp. 5.
Huang, et al. "A Contextual Term Suggestion Mechanism for Interactive Web Search ", Retrieved at<<http://www.springerlink.com/content/8j7g1hI1rt8gq8je/>>, WI 2001, LNAI 2198, Springer-Verlag Berlin Heidelberg 2001, pp. 272-281.

(Continued)

*Primary Examiner* — Jean B Fleurantin

(57) ABSTRACT

Described is a search technology in which a search engine constructs a results page for a query that integrates suggested queries with the individual query results (e.g., displayed URLs). When rendered, the proximity of the suggested queries to their corresponding individual query result provides context as to the specific URL to which the suggested query is related. Suggested queries may appear alongside their associated search result, e.g., a displayed URL, and/or in an expandable panel proximate that individual search result. Suggested queries may appear within text accompanying a URL, and/or in a drop down menu following interaction with such text or the like. Related queries may be found by using a search result URL to find a query, by analyzing a search result's text snippet, by accessing historical data, and/or by accessing current user session data.

20 Claims, 7 Drawing Sheets

OTHER PUBLICATIONS

Joho, et al."Hierarchical Approach to Term Suggestion Device", Retrieved at<<http://www.dcs.gla.ac.uk/~hideo/pub/sigir02/sigir-demo02.pdf>>, SIGIR '02, Aug. 11-15, 2002, Tampere, Finland, ACM, p. 1.

Yang, et al."Search-based Query Suggestion", Retrieved at<<http://portal.acm.org/citation.cfm?id=1458082.1458321>>, CIKM'08, Oct. 26-30, 2008, Napa Valley, California, USA, ACM, pp. 1439-1440.

Perez Juan Carlos, "Ask Jeeves Improves Query Suggestion Functionality", Retrieved at<<http://archive.thestandard.com/internetnews/003064.php>>, Apr. 4, 2005, pp. 2.

* cited by examiner

CONTEXTUAL QUERY SUGGESTION IN RESULT PAGES

BACKGROUND

A typical user behavior when searching the Web for specific information is to execute an initial query, and then one or more follow-up queries. In general, a user does this in an attempt to refine the initial results, or to obtain more information. Another typical user behavior is related to searching in an exploratory manner, in which a user starts querying around a general area of interest, using a search engine as a hub for exploring the Web.

In such situations, users generally follow a pattern of querying, namely browsing to a search result, and then returning to the search engine to reformulate the previous query. Existing query suggestion technologies assist in this process by displaying related queries in a designated location on the page. However, this does not provide the user with any particular context with respect to the other results.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a suggestion is integrated with another user interface element, such as on a page containing search results. For example, a search engine may construct a result page for a query that integrates suggested queries with the individual query results (e.g., displayed URLs, images, advertisements, and so forth). When rendered, the association of the suggested query to a user interface element, such as by being displayed proximate a corresponding individual query result, provides context as to the specific result to which the suggested query is related.

In one aspect, the search engine constructs the result page such that when the page is rendered, the suggested queries appear proximate (e.g., alongside such as to the right of) their associated search result/displayed URL. Alternatively or in addition to that rendering, the suggested queries associated with an individual search result may appear in a panel proximate that individual search result, e.g., below the displayed URL.

In one aspect, the text associated with a URL may change appearance when interacted with to indicate that the text is a suggested query and/or may be used to generate a suggested query. Suggested queries associated with an individual search result also may appear in a menu (e.g., a drop down menu) associated with that individual search result, such as in response to user interaction with part of the individual search result.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards displaying query suggestions in the context of query result information already presented on the page. This may include displaying query suggestions alongside individual query results and/or surfacing query suggestions within result summaries. New and existing user interface elements, such as the search results themselves, may be used to provide information that can guide the user in more accurately selecting the next query in a sequence. Note however that the technology is not limited to query suggestions in the results, but rather is directed towards any suggestions integrated into any user interface data structure, for example integrating a suggestion with an advertisement on a page, with a pager, as query suggestions that appear in a clickable background that updates dynamically, in a floating image, and so forth.

While various user interface examples of integrating query suggestions with other search-related information on a search page are shown, it should be understood that any of the examples described herein are non-limiting examples. Indeed any mechanism for associating any kind of suggestion (e.g., including spelling suggestions, auto-completion, related URLs (such as "other people who clicked on that URL also clicked on . . . ") with any kind of UI element are contemplated, including the UI elements shown in the examples as well as any menu item, any text and/or non-textual interfaces such as audio, video, multi-media, and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and integrating suggestions in general.

Figure 1:
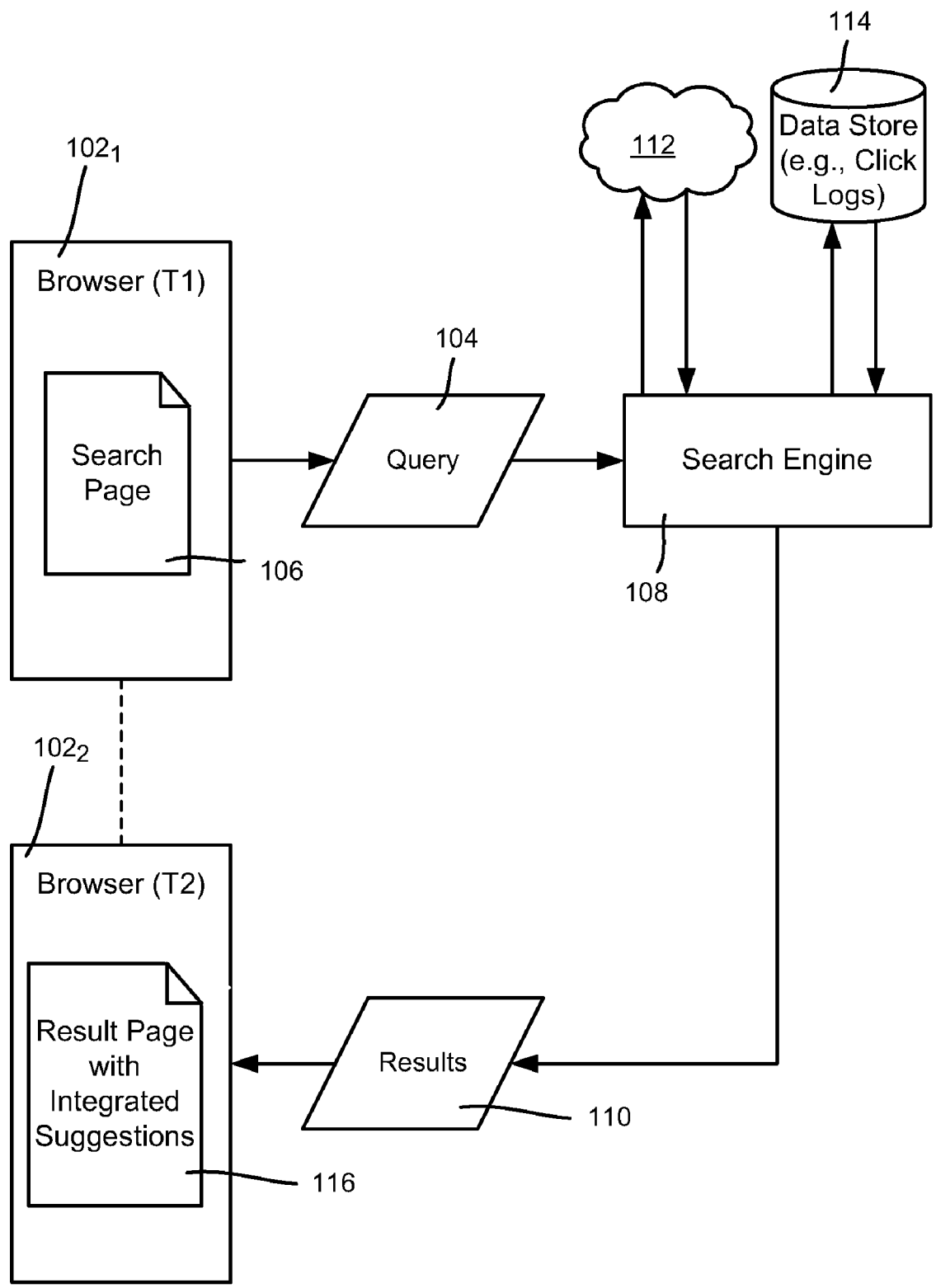
FIG. 1 is a block diagram showing example components for processing a search request and returning a result page having query suggestions integrated into the results.

FIG. 1 shows a general query request and response model as one environment for providing examples of how suggestions may be integrated into content. As is known, a user working with a browser 102, (at a time T1) sends a query 104 via interaction with a search page 106 or the like (e.g., a toolbar location) to a search engine 108. The search engine 108 operates in a known manner to find query results 110, such as URLs from one or more internet sources 112 which are returned to the user as links.

To provide additional information related to a query, the search engine 108 may reference historical data, (represented in FIG. 1 as one or more data stores 114), such as click logs/query logs. Traditionally, in addition to search results, commercial search engines have shown advertisements and instant answers such as weather forecasts, relevant to the query submitted. More recently, other information possibly relevant to the user's needs, has been added to the search result page, for one or more likely related queries in which a user may be interested, that is, query suggestions. As described herein, unlike prior result pages, when rendered by the browser $102_2$ (the same component but at a later time T2), the results 110 include the query suggestions integrated into the individual returned results of a result page 116.

To obtain query suggestions from historical data, various techniques may be used, alone or in combination with one another, to generate per-result query suggestion candidates. Per-result candidates can be generated independently of the result description (where as used herein, the term "result description" refers to the (e.g., snippet of) information displayed about a given result on the result page, typically including the result title, URL, and/or summary, as well as any other information such as an image thumbnail associated with a specific result, for example), by leveraging existing text in the result description, or by a combination thereof.

One such technique includes comparing historical aggregated user click behavior on results returned for various queries and/or comparing a query's features against features of candidate queries or their result sets in order to suggest queries that optimize the user experience. For example, query logs may be used to compare typical user behavior with respect to a query suggestion candidate against behavior on the initial query, weighting queries higher if they have historically led to different user behavior. A query can be represented in many ways, for example by the frequency of clicks on the result occurring first, or by the vector of clicks on all results. Using a known similarity metric, such as the cosine between vectors and/or distance concepts, one system may choose queries that are most dissimilar (generally meaning that they are still in some way topically-related but lead to different behavior or results) from the original query, with the intention of exposing the user to unexplored information. By comparing features of the result set for the initial query and the result sets for candidate suggestions, suggestions may be chosen in an attempt to maximize the number of useful results.

In one implementation, high-quality suggestions associated with each result and the original query may be obtained by analyzing click behavior across many users from historical query logs, that is, by accessing aggregate user session click data based upon historical click information of previous sessions of other users. To suggest queries that also return the given result, click behavior may be used to weight suggested queries. For example, the weight may depend on the frequency of clicks for the given result and query, giving the highest weight to queries where historical click frequency is neither too high nor too low. Alternative queries which have historically had significantly more clicks on that particular result than on the other results on the page may be good per-result query suggestion candidates Current user session data (generally comprising the browsing and/or searching actions a user performs within a time window) may also be used, in which information known from earlier queries in the same session or other context data (e.g., hovering over related content) may be used to help determine suggested queries. For example, a user that previously queried about (or hovered over) hotel information and then queries for "New Orleans" appears to be interested more in traveling to New Orleans than does a user that previously looked up football team records before submitting "New Orleans" as a query to the search engine; the "New Orleans" football team is likely of more interest to such a user in the latter example.

Another technique for determining a suggested query is based on where the user is currently hovering, e.g., over some set of text or possibly an image. Such information can automatically generate a query. For example, consider a user hovering over some displayed text. The hovered-over text may be used to generate one or more new queries based on the user hovering action as well as the text content. For example, a new query may be generated by adding terms from the text snippet to (or otherwise refining) an existing query, or generating a new query by recognizing which elements in the snippet are of interest to users and/or recognizing which topics in the snippet are of interest.

Queries occurring in the result description can be augmented in several ways. One way is by expanding named entities that occur within the result description. For example, abbreviations of cities ("N.O.") or organizations ("UNO") may be expanded to full names ("New Orleans" and "The University of New Orleans", respectively). Similarly, first or last names of people ("Bush") can be expanded to full names ("Reggie Bush") based on the context in which they appear (for example "New Orleans" and "football"). Terms in the original query issued by the user that retrieved the result can also be used to refine the queries extracted from the result description.

Further, the text in the result description itself may be leveraged to provide useful query suggestions, e.g., when the result description contains a high-quality query (such as queries with historically high click-through for the results returned) within its text, that query can be a useful suggestion. In other words, the search engine may analyze snippets of text corresponding to results to be returned, and use the analysis to find additional queries.

In conjunction with the result description's text, further use may be made of suggestions obtained in another way and associated with either the result URL or the user's initial query. For example, if the result description contains a word or phrase occurring in a query suggestion for the initial query or the result URL, that query suggestion can be linked to the given position in the result description.

The result description may also be used to filter and/or order query suggestion candidates that are obtained by another method and associated with the initial query or the result. For example, queries that are associated with the result, and contain text from the result description, may be ordered higher than queries that do not contain text from the result description.

Yet another implemented technique obtains a suggested query or set of queries based on a given URL. In general, this operates in reverse to conventional query processing, by taking the URL and determining which other query or queries, if received, would have returned this URL as a highly-ranked result. Note that such information is available by appropriately processing the query logs. Still further, multiple URLs may be used in a similar manner, e.g., to determine a corresponding query or queries that provide those URLs in a result set. Note that some consideration is given to the suggested per-result queries so that if a user that clicks on a suggested query (as described below), the user does not simply receive in return only suggested queries that lead to the same URL(s) over and over again.

Thus, query suggestions may be derived from result summaries in the search result page, e.g., based upon user behavior, the current set of result URLs, the text of the result description, and so forth. Any or all of the above-described techniques may be used, alone or in any combination, as well as possibly other techniques (including those not yet in practice).

However, simply obtaining the suggested queries may not provide to the user adequate context. The technology described herein is directed to presenting the suggested queries to the user in a contextual manner that assists the user in subsequent searching operations.

FIGS. 2-5 show various aspects of this technology, in the form of example user interfaces directed towards providing more context-apparent query suggestions, namely by displaying them in the context of information already on a returned page. In other words, instead of providing a global set of suggestions for a query, suggested queries for search exploration and/or refinement are integrated into any user interface elements, such as some or all of the various individual search results that appear on a page, images, UI widgets, and so forth. These user interfaces may be implemented in many different ways, including a combination of HTML, DHTML, Javascript, Microsoft® Silverlight™, SVG, Windows® Forms, Flash, Java and so forth. Note that contemporary technologies such as Silverlight™ enable asynchronous download of integrated query suggestions, providing a more flexible and responsive user interface.

To this end, in one implementation, query suggestions are associated with/integrated into new and existing user interface elements, thereby providing contextual information about the suggestions. For example, query suggestions may be listed on a per-result basis, integrated into existing text, and/or promoted from per-result suggestions to per-query suggestions.

Figure 2:
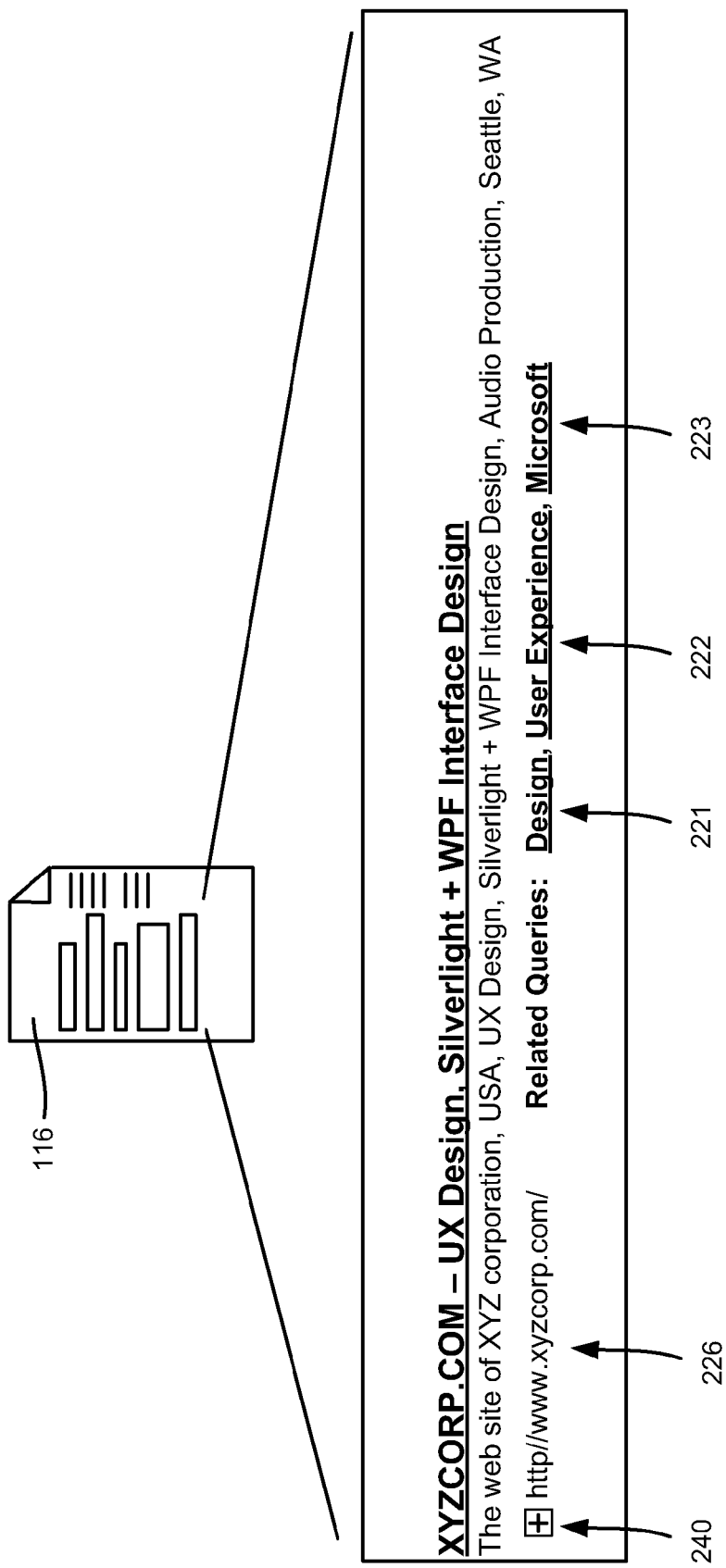
FIG. 2 is a representation of one example of how suggested (related) queries are integrated into an individual result on a results page by being displayed alongside a URL corresponding to that search result.

As generally represented in FIG. 2, one way in which the search engine 108 integrates query suggestions into a new areas in the search result page 116 is to display query suggestions alongside (e.g., to the right of) individual query results. More particularly, as represented in FIG. 2, one suitable location on the page for providing the query suggestions 221-223 is near the associated URL 226. As can be readily appreciated, the proximate position of the query suggestions 221-223 to the URL 226 from which they were generally derived or otherwise corresponds provides the user with context as to their relationship.

In another alternative represented in FIG. 3, the query suggestions (labeled 331-335 in this example) may be provided in an expandable panel 338, such as below the URL 226. To this end, the user may toggle between the alternatives of FIGS. 2 and 3 by clicking the displayed "+" sign 240 (FIG. 2) to expand and display the related query panel, and when expanded, by clicking the displayed "−" sign 340 (FIG. 3) to collapse the related query panel and instead show the queries alongside the URL. Other items on the page may be repositioned to provide room for the expanded panel. The page may be configured such that interaction with the page is possible in this way without going back to the search engine, however any interaction with the page may result in a new query being sent to the search engine to generate changed results.

Note that the suggested queries that are displayed in an expandable panel (e.g., as in FIG. 3) need not be the exact suggested queries that are alongside a URL (e.g., as in FIG. 2), and indeed, the expandable panel typically allows more query suggestions to be presented. Further, note that the ranking order may vary as well.

Still further, any ranking/ordering of any query suggestions (or other results) may be varied dynamically based on additional context that becomes apparent since the search was initiated. For example, re-ranking may be performed based upon the user having hovered over a displayed element or part thereof. Thus, it is feasible that after hovering or other interaction with results, a user may not see the same order (or even the same related queries or other results) when re-expanding a panel, for example.

Figure 3:
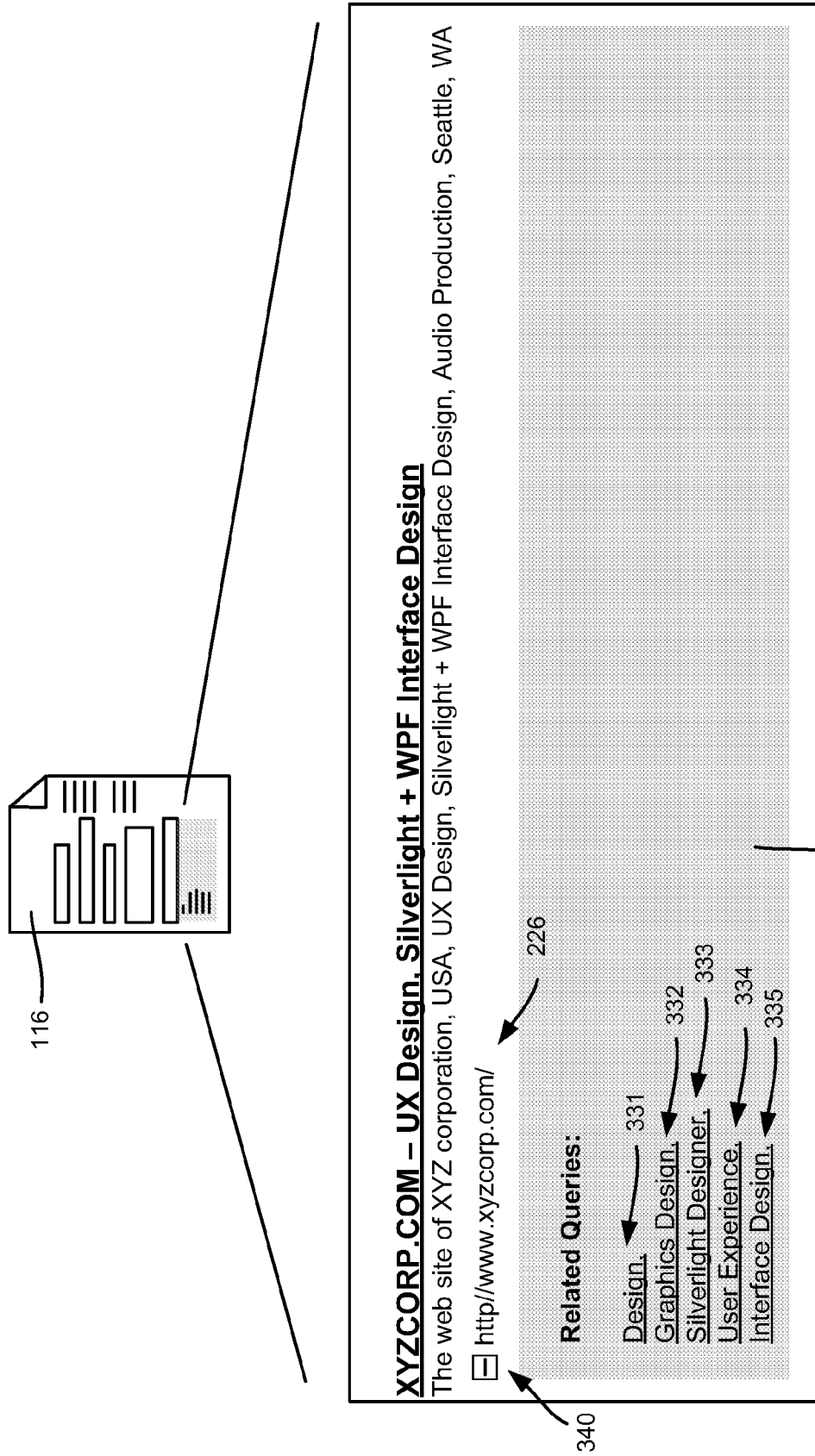
FIG. 3 is a representation of one example of how suggested queries are integrated into an individual result on a results page by being displayed in an expanded panel proximate a URL corresponding to that search result.

As can be seen, the examples of FIGS. 2 and 3 allow the user to easily see which queries lead to pages similar to a URL/page of interest, which may include the page itself. In this example, a fixed number of queries are shown in the collapsed state, with more queries included in the expanded state. The expandable area also may be used for additional information and other sorts of query suggestions, e.g., to allow URL "exploration" in the context of the result description. Note that a URL exploration user interface may be provided in place in the result description, as represented in FIGS. 2 and 3, or alternatively may be presented on another page.

Further, the result description itself can be modified to facilitate better integration of query suggestions. For example, if a summary of text on the page allows better result-specific query suggestions than the default summary, the default summary may be replaced, facilitating what are likely better query suggestions.

Query suggestions can be integrated into existing text on the page, allowing the user to interact with the text in various ways. One way to enable interaction with the result description is by enabling clicks within it, so that words from the result description can be easily appended to the current query as a new query. Such a feature may be exposed in a variety of ways, such as by a hyperlink, hover menu, or icon. Further, entire query suggestions that occur verbatim within the result description may be made active, whereby clicking on one of them issues a new query.

Figure 4:
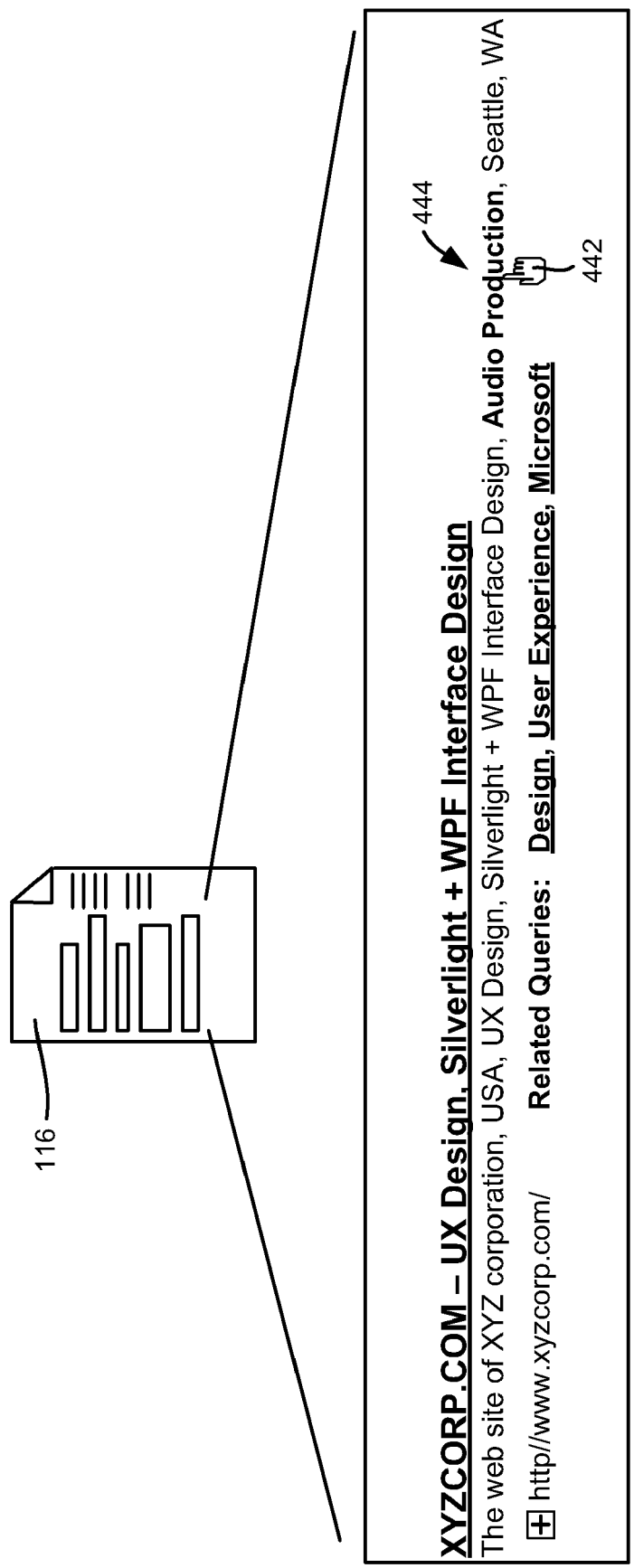
FIG. 4 is a representation of one example of how suggested queries are integrated into an individual result on a results page by having text corresponding to the result being highlighted during interaction therewith to indicate the text is clickable or otherwise corresponds to additional information.

To indicate to the user that text corresponding to a suggestion may be clicked, the text can visibly change (e.g., be highlighted, change color and/or underline) when the cursor is over them, as generally represented in FIG. 4. In FIG. 4 bold is used as the visible indication when the cursor 442 is over the text "Audio Production" 444), however a color change is likely to be used in other implementations.

Figure 5:
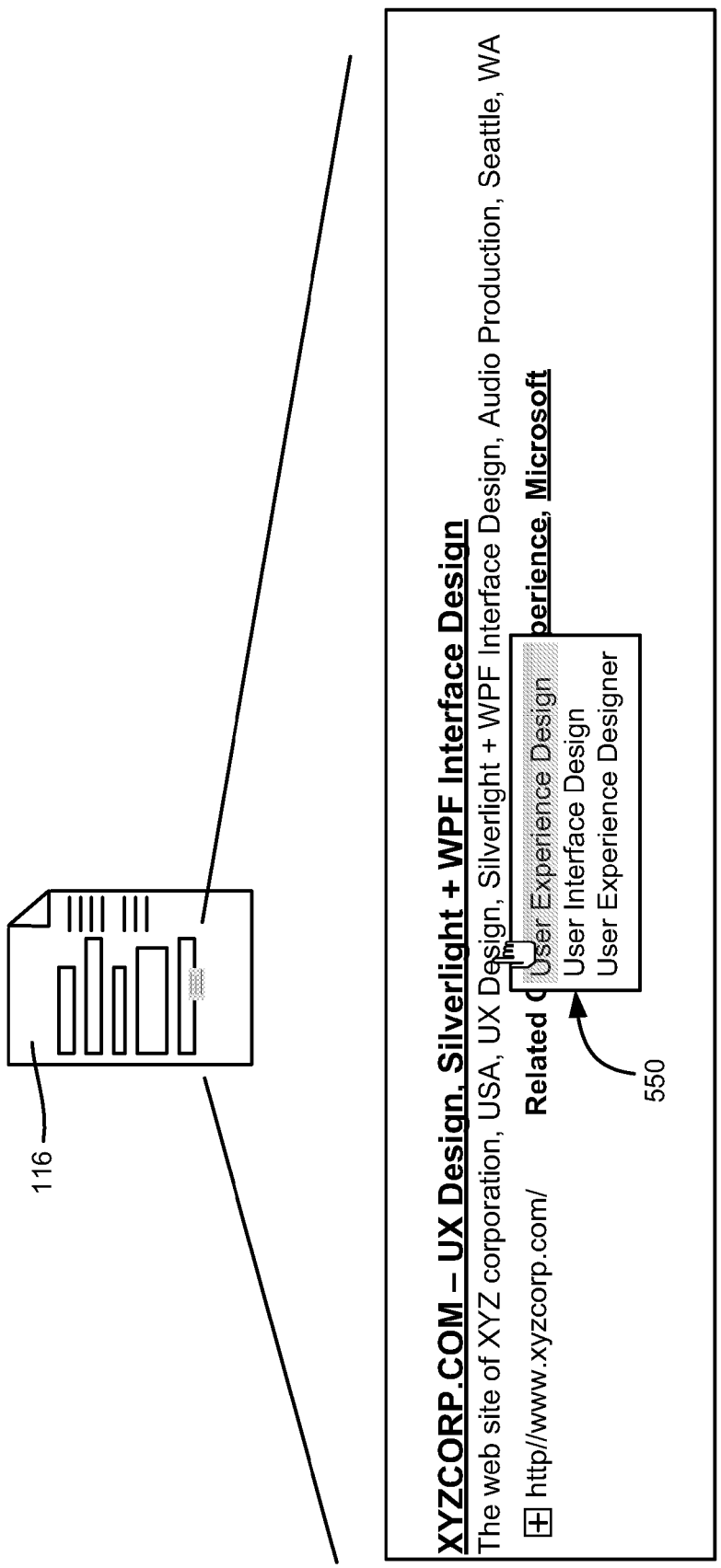
FIG. 5 is a representation of one example of how suggested queries are integrated into an individual result on a results page by having text corresponding to the result being interacted with to provide a drop down menu of related queries or other information.

FIG. 5 shows another alternative that provides a drop down menu 550 associated with the current cursor position relative to the result description; (note that this is one example menu; a pop-up or other menu may be used). In FIG. 5, the term "User Experience Design" and the other query suggestions in the menu do not necessarily occur verbatim in any text, but are related to the text "UX Design" by expansion and/or association. The dropdown menu can be activated on right click, left click, hover, or other interaction with the page (even including eye tracking); for example, hovering may briefly provide the visible change in FIG. 4, while continuing to hover for a longer time causes the dropdown menu 550 to appear. Terms associated with query suggestions through selection or dropdown can be highlighted, by drawing a border around them, changing fonts, or shading them differently.

As can be seen, any text surrounding the query suggestions can provide additional context for retrieving or ranking search results when the suggested query is issued. A dropdown menu or the like may show top search results for the suggested query, and/or may include additional options for the query suggestions, such as showing queries similar to the suggested query, or regenerating just the search result summaries based on the suggested query.

Figure 6:
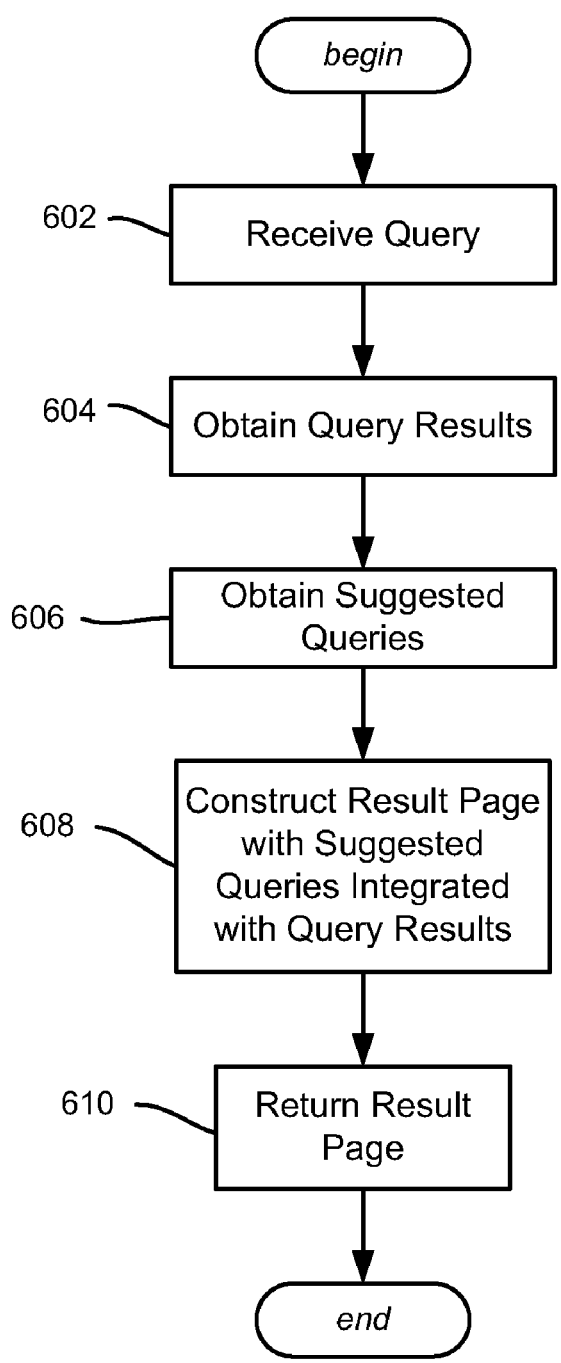
FIG. 6 is a flow diagram showing example steps taken to integrate suggested queries into a results page.

FIG. 6 is a flow diagram showing steps taken to provide a page with integrated query suggestions, beginning at step 602 which represents receiving the query. Step 604 obtains the conventional query results.

Step 606 represents obtaining suggested queries, using any of the above-described techniques, e.g., historical data access, text analysis, finding queries given a URL, and so forth. Note that user session information may be known to the search engine, and thus, for example, the results may be based on previous user actions.

Step 608 constructs the result page that includes the integrated suggested queries. While conventional browsers are able to render the page, additional functionality may be enabled by having a custom-made browser that knows about integrated suggested queries, and, for example, may apply user customizations to adjust the output of suggested queries in accordance with a user's preferences. Further note that suggestions may be presented without a browser, e.g. by a different operating system component or another application. Step 610 represents returning the result page.

Exemplary Operating Environment

Figure 7:
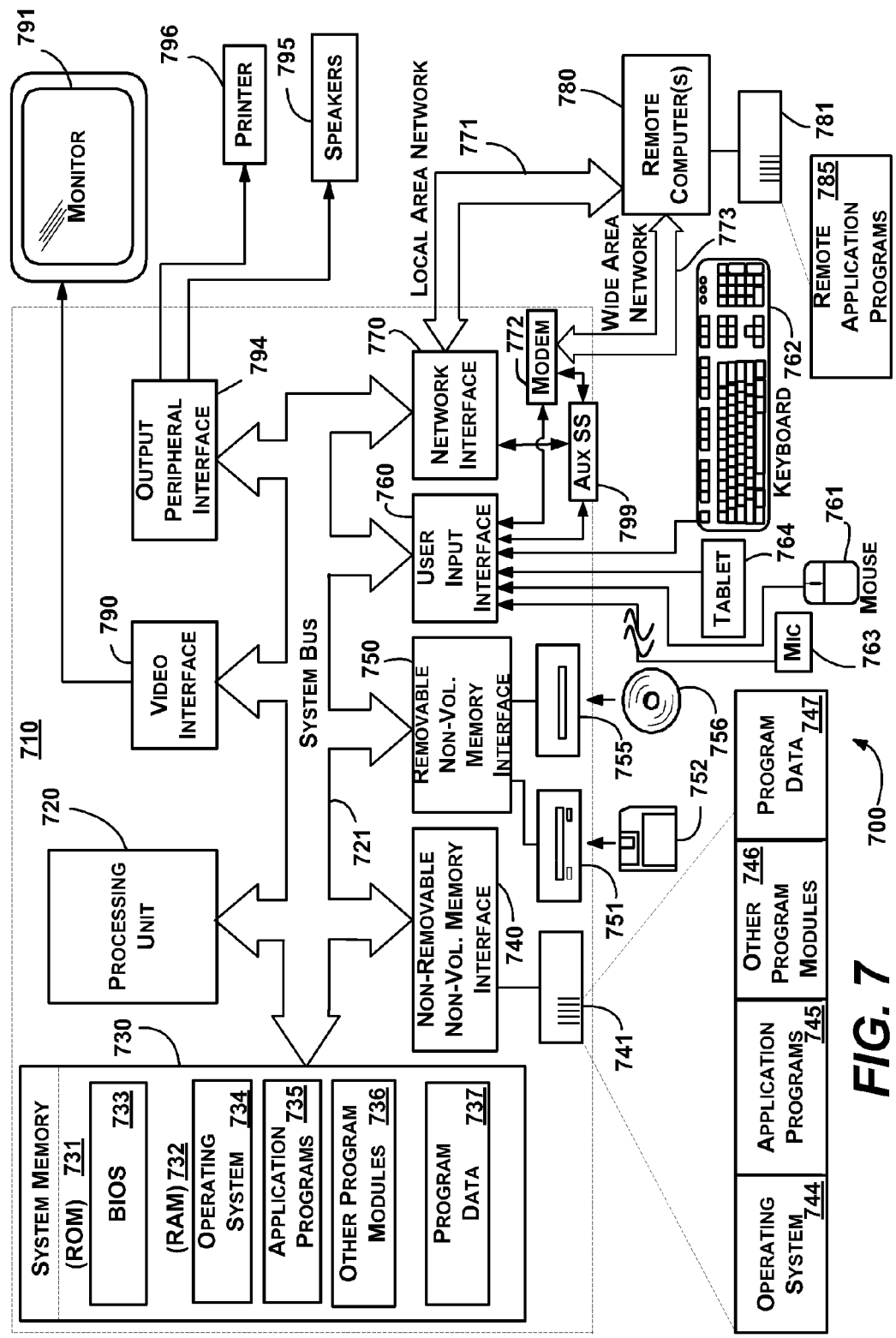
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented, such as to output the query results with integrated query suggestions. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   constructing a result page including a plurality of search results that are responsive to a received query, the plurality of search results including an individual search result comprising a uniform resource locator (URL);
   obtaining a suggested query related to the individual search result by using the URL to obtain the suggested query; and
   integrating the suggested query with the individual search result for output via the result page,
   wherein the suggested query appears proximate to the individual search result in the result page to indicate that the suggested query is related to the individual search result,
   wherein the result page is constructed such that when the result page is rendered and interacted with, the suggested query appears in a panel;
   and wherein at least the integrating is performed by a computing device.

2. The method of claim 1 further comprising generating a second query based upon interaction with the suggested query.

3. The method of claim 1 further comprising:
   modifying the received query based upon interaction with the suggested query, and sending the modified received query to a search engine.

4. The method of claim 1, wherein obtaining the suggested query comprises analyzing text corresponding to the individual search result.

5. The method of claim 1, wherein obtaining the suggested query comprises accessing historical data.

6. The method of claim 1, wherein obtaining the suggested query comprises accessing information related to a current user session.

7. One or more computer-readable storage media having computer-executable instructions, which when executed perform:
   receiving a query;
   obtaining a plurality of search results corresponding to the received query;
   for an individual search result of the plurality of search results, obtaining a suggested query that is associated with the individual search result instead of other search results from the plurality of search results; and
   integrating the suggested query with the individual search result by constructing a page such that when the page is displayed, the suggested query appears proximate to the individual search result on the displayed page to show that the suggested query is associated with the individual search result instead of being associated with the other search results from the plurality of search results.

8. The one or more computer-readable storage media of claim 7, wherein obtaining the suggested query comprises one or more of:
   using a URL identifying the individual search result to determine the suggested query,
   analyzing text corresponding to the individual search result,
   accessing historical data, or
   accessing information related to a current user session.

9. The one or more computer-readable storage media of claim 7 having further computer-executable instructions which when executed perform:
   receiving another query corresponding to interaction with the suggested query; and
   providing further search results and further suggested queries in response to the another query.

10. The one or more computer-readable storage media of claim 7 having further computer-executable instructions which when executed perform:
   obtaining a second individual suggested query that is associated with the individual search result instead of the other search results.

11. The one or more computer-readable storage media of claim 10, wherein the second suggested query also appears proximate to the individual search result on the displayed page to show that the second suggested query is associated with the individual search result instead of being associated with the other search results from the plurality of search results.

12. The one or more computer-readable storage media of claim 7 having further computer-executable instructions which when executed perform:
   comparing features of the received query to features of candidate suggested queries; and
   selecting the suggested query from the candidate suggested queries based on the comparing.

13. The one or more computer-readable storage media of claim 7, wherein the suggested query is determined using a similarity metric.

14. The one or more computer-readable storage media of claim 13, wherein the similarity metric comprises a cosine between vectors.

15. The one or more computer-readable storage media of claim 7 having further computer-executable instructions which when executed perform:
   for a second individual search result of the plurality of search results, determining a second suggested query that is associated with the second individual search result; and
   integrating the second suggested query with the plurality of search results by constructing the page such that when the page is displayed, the second suggested query appears proximate to the second individual search result on the displayed page.

16. A system comprising:
   a storage device comprising instructions configured to:
   receive a query,
   obtain a plurality of search results corresponding to the received query,
   for an individual search result of the plurality of search results, obtain a suggested query that is associated with the individual search result instead of other search results from the plurality of search results, and
   integrate the suggested query with the individual search result by constructing a page such that when the page is displayed, the suggested query appears proximate to the individual search result on the displayed page and indicates that the suggested query is associated with the individual search result instead of being associated with the other search results from the plurality of search results;
   and a processing unit configured to execute the instructions.

17. The system according to claim 16, wherein the instructions are further configured to analyze text corresponding to the individual search result to obtain the suggested query.

18. The system according to claim 16, wherein the instructions are further configured to obtain a second individual suggested query that is associated with the individual search result instead of the other search results.

19. The system according to claim 18, wherein the instructions are further configured to construct the page such that the second suggested query also appears proximate to the individual search result on the displayed page and indicates that the second suggested query is associated with the individual search result instead of being associated with the other search results from the plurality of search results.

20. The system of claim 16, wherein the suggested query is determined using a similarity metric.

* * * * *